(12) United States Patent
Kulogo et al.

(10) Patent No.: US 7,362,018 B1
(45) Date of Patent: Apr. 22, 2008

(54) ENCODER ALTERNATOR

(75) Inventors: Timothy J. Kulogo, Fond du Lac, WI (US); Jeffery M. Konopacki, Ripon, WI (US)

(73) Assignee: Brunswick Corporation, Lake Forest, IL (US)

( * ) Notice: Subject to any disclaimer, the term of this patent is extended or adjusted under 35 U.S.C. 154(b) by 208 days.

(21) Appl. No.: 11/337,421

(22) Filed: Jan. 23, 2006

(51) Int. Cl.
*H02K 11/00* (2006.01)
*H02K 7/02* (2006.01)

(52) U.S. Cl. .................... 310/68 B; 310/74; 310/70 A; 310/153

(58) Field of Classification Search ............. 310/68 B, 310/70 A, 74, 153, 179; 123/599, 605
See application file for complete search history.

(56) References Cited

U.S. PATENT DOCUMENTS

| | | | |
|---|---|---|---|
| 2,945,138 A | 7/1960 | Strang | |
| 3,495,579 A * | 2/1970 | Davalillo | ................. 123/149 R |
| 3,535,571 A | 10/1970 | Heinzen | |
| 3,549,925 A | 12/1970 | Johnson | |
| 3,629,632 A * | 12/1971 | Loupe | .......................... 310/74 |
| 3,937,200 A | 2/1976 | Sleder et al. | |
| 4,093,306 A | 6/1978 | Zitone | |
| 4,275,322 A * | 6/1981 | Cavil et al. | .................. 310/111 |
| 4,636,671 A | 1/1987 | Terada | |
| 4,754,207 A * | 6/1988 | Heidelberg et al. | ......... 318/254 |
| 4,779,454 A | 10/1988 | Fitzner et al. | |
| 4,879,486 A | 11/1989 | Yumiyama | |
| 4,892,079 A * | 1/1990 | Umezu et al. | ......... 123/406.57 |
| 5,072,714 A * | 12/1991 | Bengtsson et al. | .......... 123/601 |
| 5,164,623 A * | 11/1992 | Shkondin | .................. 310/67 R |
| 6,384,496 B1 * | 5/2002 | Pyntikov et al. | .......... 310/68 B |
| 6,720,698 B2 * | 4/2004 | Galbraith | ..................... 310/166 |

* cited by examiner

*Primary Examiner*—Thanh Lam
(74) *Attorney, Agent, or Firm*—Andrus, Sceales, Starke & Sawall, LLP

(57) ABSTRACT

An encoder alternator for an internal combustion engine has a rotor with a plurality of circumferential magnetic rotor poles in a periodic pattern except for at least one magnetic irregularity. A sensor coil is wound around a stator pole and outputs a crankshaft position sensor signal when the magnet irregularity of the rotor passes the stator pole.

7 Claims, 4 Drawing Sheets

ENCODER ALTERNATOR

BACKGROUND AND SUMMARY

The invention relates to alternators for internal combustion engines.

Alternators for internal combustion engines are known in the prior art. The alternator is driven by a rotary crankshaft of the engine and supplies electrical power for the engine. Various engine control functions, such as ignition timing, injector timing, etc., require that crankshaft position be known. Typically, in the prior art, angular position of the crankshaft is provided by a reluctor or reluctance wheel, e.g. having ferrous material in an encoder pattern, such as a missing tooth or a given tooth pattern, which passes a magnet or sensor such that the flux or field density changes, i.e. changes the reluctance relationship. The sensor may be a Hall effect sensor, a VR (variable reluctance) sensor, and so on. For small, low-cost engines, externally mounted sensors and encoder wheels are cost prohibitive.

The present invention address and solves the noted need, including providing an integrated engine encoder alternator, using the alternator to additionally provide the noted encoding function.

DETAILED DESCRIPTION

Figure 1:
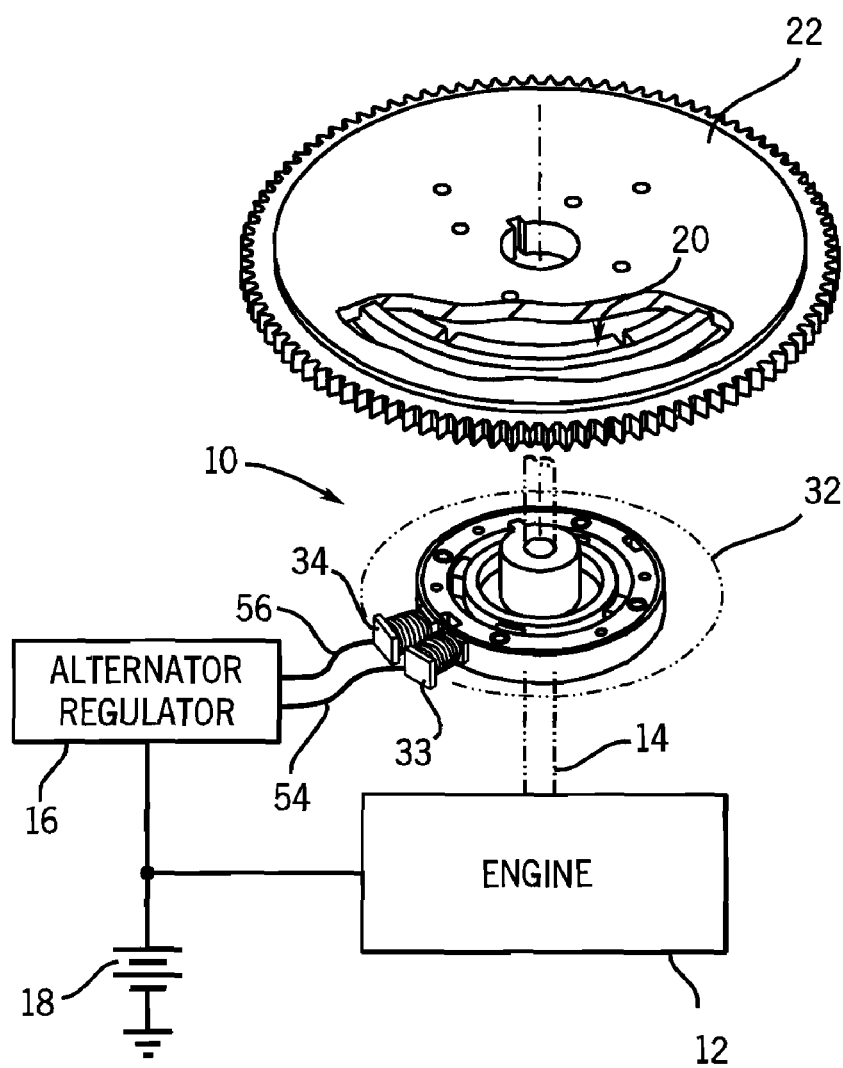
FIG. 1 is an exploded perspective schematic view of an alternator for an internal combustion engine, as known in the prior art.
Figure 2:
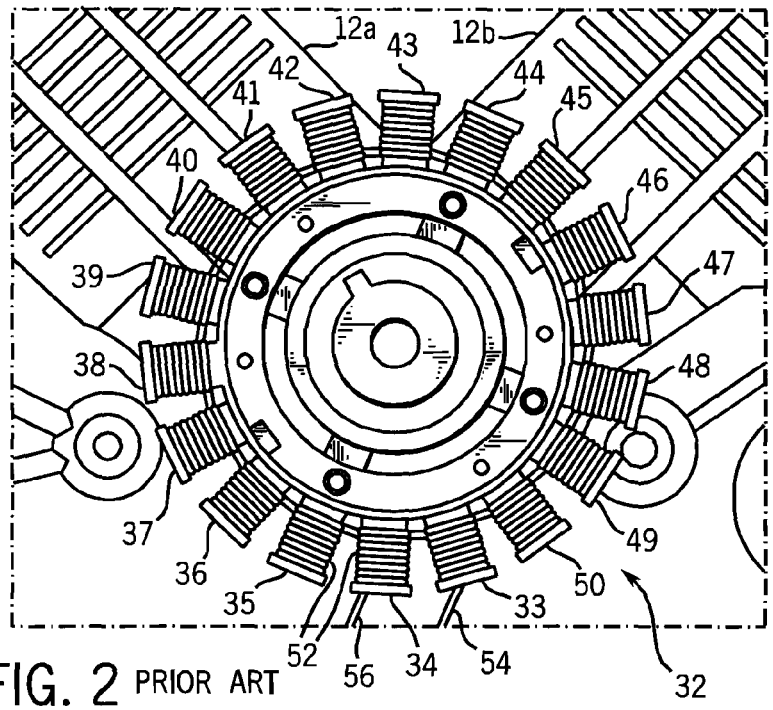
FIG. 2 is a plan view of the stator of FIG. 1, as known in the prior art.

FIG. 1 shows an alternator 10 for an internal combustion engine 12 having a rotary crankshaft 14. The alternator is driven by the crankshaft and supplies electrical power for the engine, e.g. through an alternator regulator 16 and including for charging battery 18. The alternator includes a permanent magnet rotor 20 mounted for rotation by the crankshaft, e.g. by being mounted to the flywheel 22, and having a plurality of circumferential magnetic rotor poles 24, FIGS. 1, 3, with spaced north-south pole borders in a periodic pattern. For example, in the embodiment of FIG. 3, six arcuate permanent magnets 25, 26, 27, 28, 29, 30 are mounted to flywheel 22, each magnet having three north-south pole pairs. A stator 32 is stationarily mounted to the engine and has a plurality of stator poles, two of which are shown at 33, 34, FIG. 1, for magnetic flux coupling with the permanent magnet rotor poles as flywheel 22 rotates upon rotation of engine crankshaft 14. In the embodiment of FIG. 2, there are eighteen stator poles, which number is preferably chosen to match the eighteen rotor poles of rotor 20. In assembled condition, the magnets 25-30 providing the noted rotor poles are spaced slightly radially outwardly of the stator poles 33, 34, 35, 36, 37, 38, 39, 40, 41, 42, 43, 44, 45, 46, 47, 48, 49, 50. FIG. 2 is a top plan elevation view from above showing the stator mounted on the engine, for example a V-type engine having cylinder banks 12*a* and 12*b*.

Figure 3:
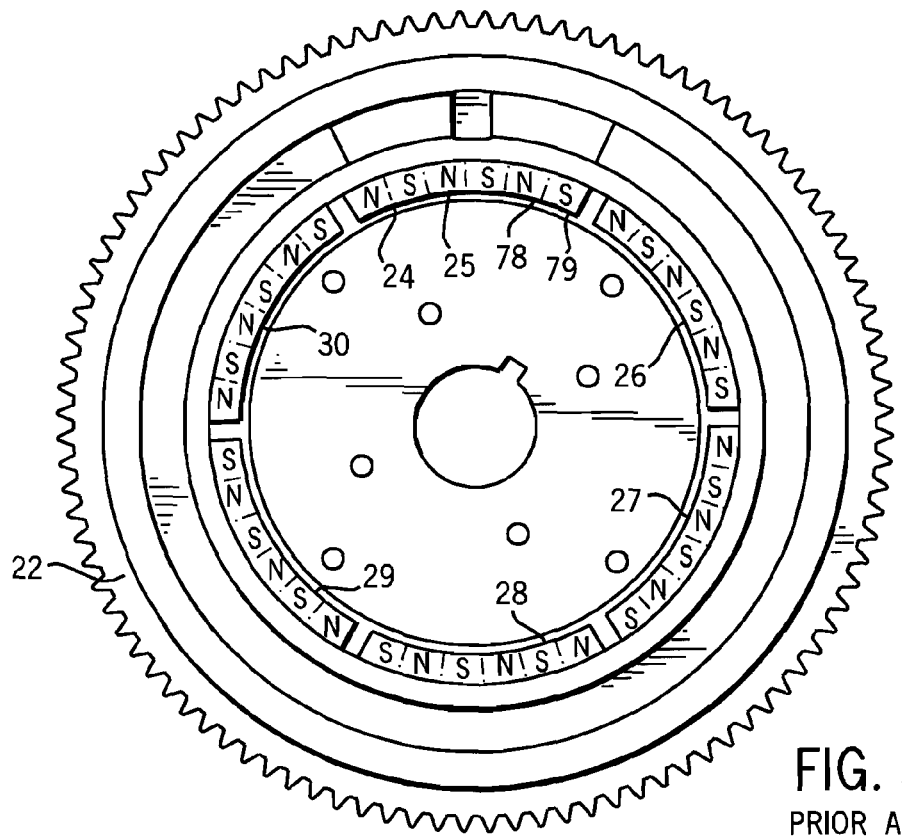
FIG. 3 is a plan view of the fly wheel rotor of FIG. 1, as known in the prior art.

FIG. 3 is a bottom plan elevation view from below of the flywheel, and showing magnets 25-30 secured thereto, e.g. by adhesive. The stator poles have an output current coil 52 wound therearound and generating charging current providing electrical power on output terminals 54 and 56. As is standard, the output current coil 52 typically has a plurality of sets of multiple loops wound around respective stator poles and connected in series and generating charging current.

Figure 4:
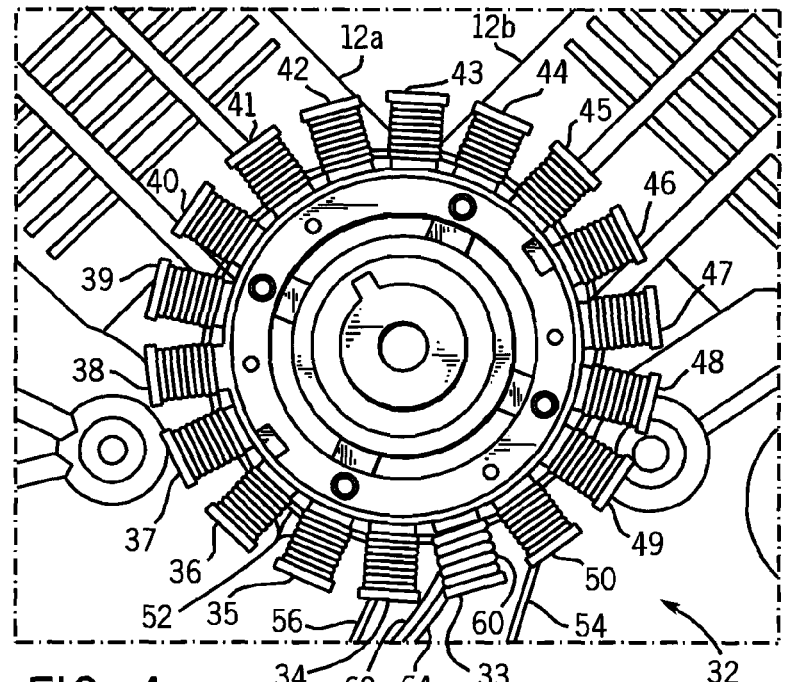
FIG. 4 is like FIG. 2 and shows the present invention.
Figure 5:
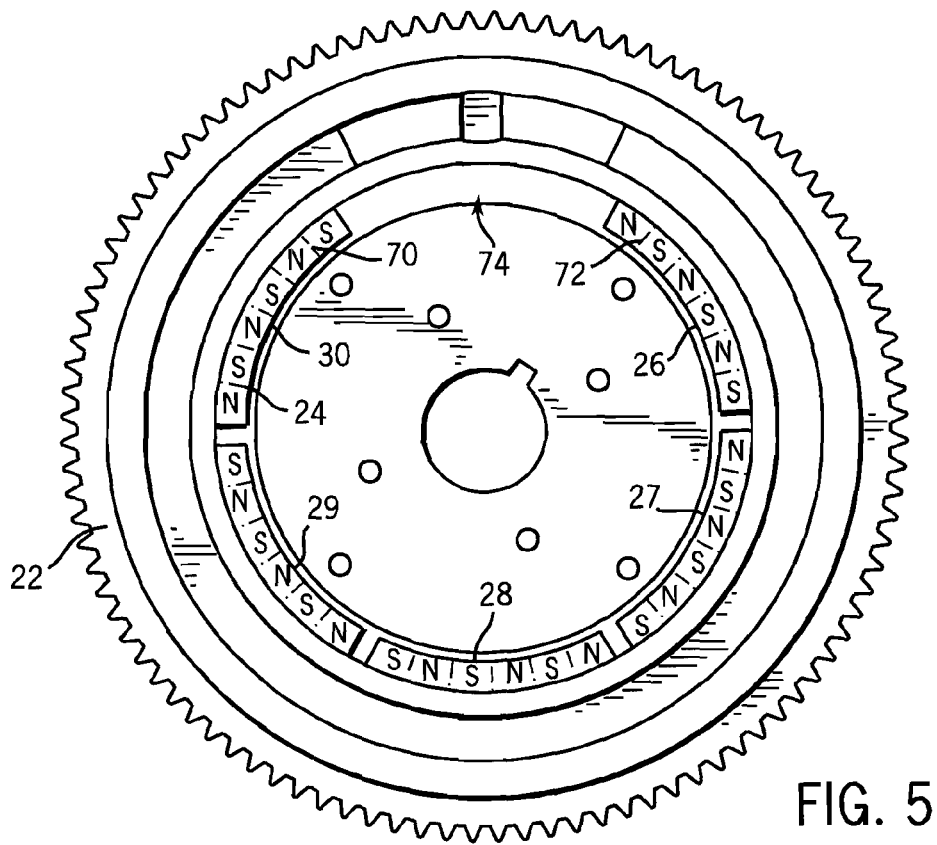
FIG. 5 is like FIG. 3 and shows the present invention.
Figure 6:
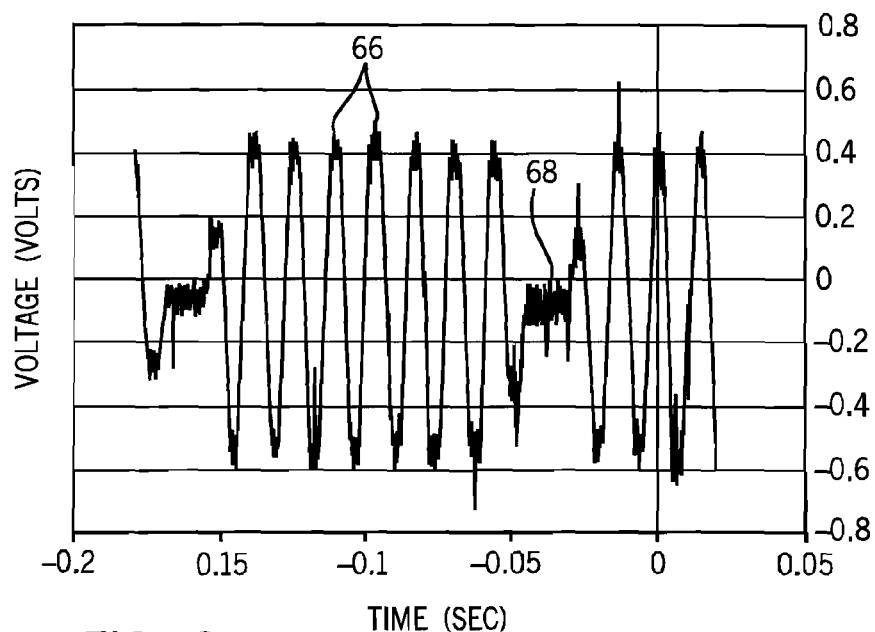
FIG. 6 is a voltage waveform illustrating operation of the present invention.

FIGS. 4-7 illustrate the present invention, and use like reference numerals from above where appropriate to facilitate understanding. The noted plurality of circumferential magnetic rotor poles 24 have the noted spaced north-south pole borders in the noted periodic pattern except for at least one magnetic irregularity. In FIG. 5, this irregularity is provided by removing magnet 25 of FIG. 3, and thus eliminating three of the noted magnetic rotor poles and three of the noted north-south pole borders by eliminating three north-south pole pairs. Other types of magnetic irregularities may be provided, to be described. At least one of the stator poles, for example pole 33, has a sensor coil 60 wound therearound and outputting on terminals 62 and 64 a sensor signal when the noted magnetic irregularity of rotor 20 passes the one stator pole 33 as flywheel 22 rotates. The elimination of magnet 25 provides a missing pulse or a detectable reference signal relative to the periodic pattern of the remaining magnetic rotor poles as they pass stator pole 33 and sensor coil 60. The position sensor signal provided by the missing pulse or detectable reference signal identifies the angular position of the crankshaft, thus affording an encoder. FIG. 6 illustrates a plurality of pulses such as 66 provided by the noted periodic pattern of magnetic rotor poles, and a missing pulse such as at 68 corresponding to the noted magnetic irregularity, such as provided by the noted missing magnet.

In one embodiment, the number of stator poles is different than the number of rotor poles, for example eighteen stator poles in FIG. 4 and fifteen rotor poles in FIG. 5. Output current coil 52 is wound around designated stator poles and generates charging current providing electrical power for the engine. The output current coil is preferably wound around all of the stator poles except the noted stator pole such as 33 having the sensor coil 60 wound therearound. The sensor coil is preferably wound around stator pole 33 in place of current coil 52. Coil 52 has the noted plurality of multiple loops wound around designated stator poles and connected in series and generating charging current, as above noted. In the preferred embodiment, there are N stator poles, e.g. eighteen, and N−1 sets of loops of the current coil, one set for each stator pole except the noted one stator pole such as 33, and sensor coil 60 is provided by one or more loops wound around the one stator pole 33 in place of the output current coil 52. The N stator poles are uniformly angularly spaced from each other by $$\frac{360°}{N}.$$

The rotor north-south pole borders are spaced in the noted periodic pattern except at the noted at least one magnetic irregularity which is provided by a designated pair of north-south pole borders such as 70 and 72 spaced by an angular gap 74 substantially different than $$\frac{360°}{N}.$$

Figure 7:
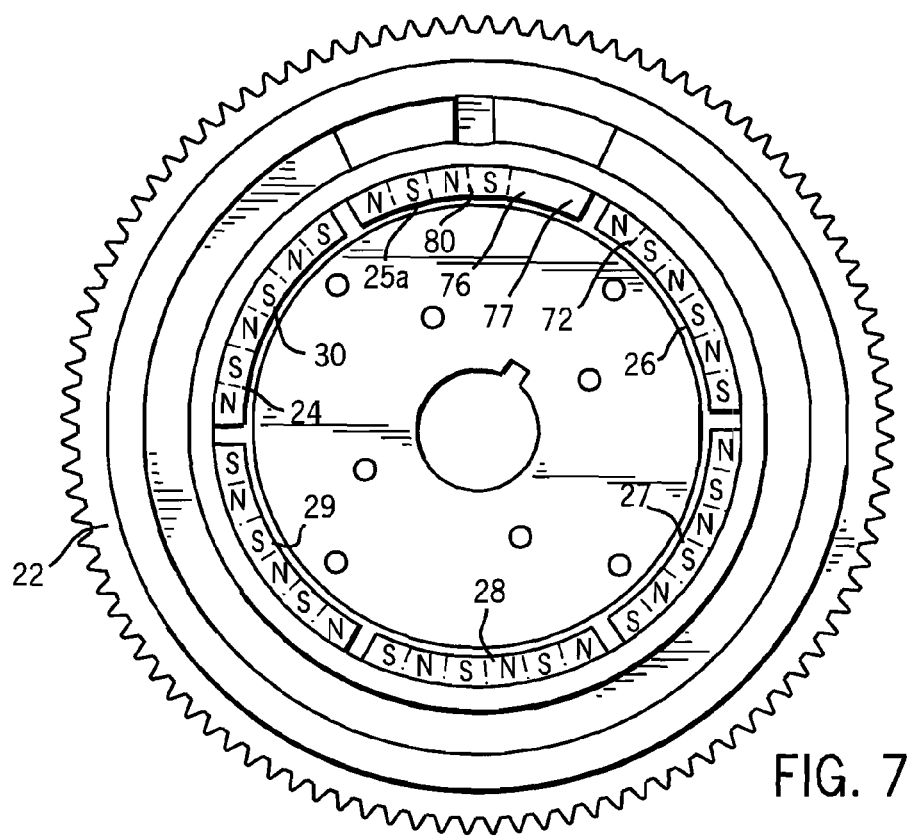
FIG. 7 is like FIG. 5 and shows a further embodiment.

In the embodiment of FIG. 4, the eighteen stator poles are angularly spaced by 20 degrees, and angular gap 74 between pole borders 70 and 72 is about 80 degrees. In another embodiment, FIG. 7, a magnet 25a is provided, like magnet 25, but having non-magnetized portions 76 and 77 where such portions had previously been magnetized as shown in FIG. 3 at 78 and 79, respectively. Non-magnetized portions 76, 77 provide the noted magnet irregularity sensed by sensor coil 60 to provide a position sensor signal when such magnet irregularity of rotor 20 passes stator pole 33 as flywheel 22 rotates. In a further embodiment, magnet 25a is shortened, to eliminate sections 76, 77, thus providing a shorter magnet than the remaining magnets 26-30, which shorter magnet and the empty gap vacated thereby provides the noted magnetic irregularity. In FIG. 7, the angular gap at non-magnetized or eliminated sections 76, 77 is at least twice as great as $$\frac{360°}{N},$$

e.g. the angular gap between north-south pole borders 72 and 80 is about 40 degrees.

It is expected that various equivalents, alternatives and modifications are possible within the scope of the appended claims.

What is claimed is:

1. An alternator for an internal combustion engine having a rotary crankshaft, said alternator being driven by said crankshaft and supplying electrical power for said engine, comprising a permanent magnet rotor mounted for rotation by said crankshaft and having a plurality of circumferential magnetic rotor poles with spaced north-south pole borders in a periodic pattern except for at least one magnetic irregularity, a stator mounted to said engine and having a plurality of stator poles for magnetic flux coupling with said permanent magnet rotor poles, an output current coil wound around designated stator poles and generating charging current providing said electrical power, at least one of said stator poles having a sensor coil would therearound and outputting a crankshaft position sensor signal when said magnetic irregularity of said rotor passes said one stator pole.

2. The alternator according to claim 1 wherein the number of said stator poles is different than the number of said rotor poles.

3. The alternator according to claim 1 wherein said output current coil is wound around all of said stator poles except said one stator pole.

4. The alternator according to claim 1 wherein said output current coil comprises a plurality of sets of multiple loops wound around said designated stator poles and connected in series and generating said charging current.

5. The alternator according to claim 4 comprising N said stator poles, and N−1 said sets of loops, one set for each said stator pole except said one stator pole, and wherein said sensor coil comprises one or more loops wound around said one stator pole in place of said output current coil.

6. The alternator according to claim 1 wherein:
said stator has N said stator poles uniformly angularly spaced from each other by $$\frac{360°}{N};$$

said rotor north-south pole borders are spaced in said periodic pattern except said at least one magnetic irregularity comprising a designated pair of north-south pole borders spaced by an angular gap substantially different than $$\frac{360°}{N}.$$

7. The alternator according to claim 6 wherein said angular gap is at least twice as great as $$\frac{360°}{N}.$$

* * * * *